(12) United States Patent
Nishijima et al.

(10) Patent No.: US 11,050,376 B2
(45) Date of Patent: Jun. 29, 2021

(54) CONTROL DEVICE FOR PERMANENT MAGNET TYPE ROTATING ELECTRICAL MACHINE

(71) Applicant: Mitsubishi Electric Corporation, Tokyo (JP)

(72) Inventors: Yoshimasa Nishijima, Tokyo (JP); Keiichi Enoki, Tokyo (JP); Masutaka Watanabe, Tokyo (JP); Yasukazu Murata, Hyogo (JP); Shingo Harada, Tokyo (JP); Kazuhiko Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/609,489

(22) PCT Filed: Jun. 6, 2017

(86) PCT No.: PCT/JP2017/020908
§ 371 (c)(1),
(2) Date: Oct. 30, 2019

(87) PCT Pub. No.: WO2018/225139
PCT Pub. Date: Dec. 13, 2018

(65) Prior Publication Data
US 2020/0144948 A1 May 7, 2020

(51) Int. Cl.
*H02P 1/18* (2006.01)
*H02P 21/14* (2016.01)
(Continued)

(52) U.S. Cl.
CPC ............ *H02P 21/141* (2013.01); *H02P 11/06* (2013.01); *H02P 21/06* (2013.01)

(58) Field of Classification Search
CPC ...... H02P 2207/05; H02P 21/18; H02P 11/06; H02P 21/06; H02P 21/141; H02P 2203/05
See application file for complete search history.

(56) References Cited

U.S. PATENT DOCUMENTS 5,640,073 A * 6/1997 Ikeda ..................... H02P 6/085
318/400.03
5,872,710 A * 2/1999 Kameyama ....... H02M 7/53875
363/131
(Continued)

FOREIGN PATENT DOCUMENTS

JP  2004-129359 A  4/2004
JP      3688673 B2  8/2005
(Continued)

OTHER PUBLICATIONS

International Search Report of PCT/JP2017/020908 dated Aug. 15, 2017.
(Continued)

*Primary Examiner* — Muhammad S Islam
(74) *Attorney, Agent, or Firm* — Sughrue Mion, PLLC; Richard C. Turner

(57) ABSTRACT

In order to reduce deviation of correction amount when calculating a magnetic pole position correction amount of a permanent magnet type rotating electrical machine, and perform magnetic pole position correction with high accuracy, in state where the permanent magnet type rotating electrical machine is rotated, a d-axis current command value and a q-axis current command value in dg vector control are kept substantially zero, an actual d-axis voltage and an actual q-axis voltage are calculated from a midpoint potential detected from a midpoint potential detection unit, a magnetic pole position correction amount is calculated based on a predetermined arithmetic expression from the actual d-axis voltage and the actual q-axis voltage, and (Continued)

magnetic pole position origin correction is performed based on the magnetic pole position correction amount.

10 Claims, 10 Drawing Sheets

(51) Int. Cl.
*H02P 11/06* (2006.01)
*H02P 21/06* (2016.01)

(56) References Cited

U.S. PATENT DOCUMENTS

| | | | | |
|---|---|---|---|---|
| 2004/0061461 | A1* | 4/2004 | Tajima | B60K 6/26 |
| | | | | 318/400.02 |
| 2005/0093505 | A1* | 5/2005 | Kameya | B62D 5/0487 |
| | | | | 318/805 |
| 2006/0125439 | A1* | 6/2006 | Ajima | B60L 50/16 |
| | | | | 318/716 |
| 2010/0259204 | A1* | 10/2010 | Imura | H02P 6/085 |
| | | | | 318/400.02 |
| 2013/0278195 | A1 | 10/2013 | Kobayashi et al. | |
| 2016/0173018 | A1* | 6/2016 | Nondahl | H02P 6/28 |
| | | | | 318/400.02 |

FOREIGN PATENT DOCUMENTS

| | | |
|---|---|---|
| JP | 2013-225999 A | 10/2013 |
| JP | 5642251 B2 | 12/2014 |
| WO | 2014/073031 A1 | 5/2014 |

OTHER PUBLICATIONS

Communication dated Nov. 4, 2020 from the Japanese Patent Office in Patent Application No. 2019-523230.

* cited by examiner

CONTROL DEVICE FOR PERMANENT MAGNET TYPE ROTATING ELECTRICAL MACHINE

CROSS REFERENCE TO RELATED APPLICATIONS

This application is a National Stage of International Application No. PCT/JP2017/020908 filed Jun. 6, 2017.

TECHNICAL FIELD

The present invention relates to a control device for a permanent magnet type rotating electrical machine, and particularly to the control device for the permanent magnet type rotating electrical machine mounted on a vehicle such as a hybrid vehicle.

BACKGROUND ART

The permanent magnet type rotating electrical machine is configured to have a rotating field type in which a permanent magnet is a rotor and an armature winding is a stator. The permanent magnet type rotating electrical machine is mounted on the hybrid vehicle or the like and exhibits both functions of functioning as a generator by receiving mechanical energy from an engine and functioning as a motor generating driving force by receiving electric energy.

Generally, when driving the permanent magnet type rotating electrical machine mounted on the vehicle as the motor, control is performed by controlling current to the armature winding of the rotating electrical machine based on a magnetic pole position of the rotor detected by a magnetic pole position sensor such as a synchro resolver. However, there is a problem that a desired torque cannot be obtained when a detected value of the magnetic pole position deviates from an actual magnetic pole position due to a mounting error or positional deviation of the magnetic pole position sensor.

In order to solve this problem, the detected value the magnetic pole position sensor is corrected to the actual magnetic pole position of the rotor. For example, in the conventional control device disclosed in Patent Literature 1, both a d-axis current command value and a q-axis current command value in dq vector control are kept zero in a state where the rotor of the permanent magnet type rotating electrical machine is rotating. While keeping the values zero, dq vector control process is performed, and a magnetic pole position correction amount is calculated based on a predetermined arithmetic expression from a d-axis voltage command value and a q-axis voltage command value obtained by the process, to correct a magnetic pole detection position detected by the magnetic pole position sensor.

In the control device for the conventional synchronous machine described in Patent Literature 2, it is detected whether the vehicle is just before stopping, and when it is determined that it is just before stopping, the d-axis current command value and the q-axis current command value are set to zero. Based on the d-axis voltage command value and the q-axis voltage command value at that time, a phase difference from a detection phase by the magnetic pole position sensor is detected, to correct the detection phase based on the phase difference.

The control described in Patent Literature 1 and Patent Literature 2 is the dq vector control, and is the control of the rotating electrical machine performed on a dq coordinate system by defining a direction of magnetic flux produced by the magnetic pole (central axis of permanent magnet) as a d-axis and defining an axis (axis between permanent magnets) electrically and magnetically orthogonal to the d-axis as a q-axis.

CITATION LIST

Patent Literature

Patent Literature 1: Japanese Patent No. 3688673
Patent Literature 2: Japanese Patent No. 5642251

SUMMARY OF THE INVENTION

Technical Problem

In the conventional control devices disclosed in Patent Literature 1 and Patent Literature 2, the magnetic pole position correction amount is calculated from the axis voltage command value and the q-axis voltage command value.

After converting the d-axis voltage command value and the q-axis voltage command value into a three-phase voltage command, it is necessary to perform dead time correction or the like to match a command voltage to an actual voltage, however, appropriate correction cannot be made due to element variation and an error may occur between the command voltage and the actual voltage. That is, when the error is included in the dead time correction, the error is also generated in the magnetic pole position correction amount calculated based on the dead time correction.

In such a case, accuracy of the calculated magnetic pole position correction amount is deteriorated in methods described in Patent Literatures 1 and 2.

In view of the above-described conventional defects, an object of the present invention is to provide the control-device for the permanent magnet type rotating electrical machine capable of reducing deviation of the correction amount when calculating the magnetic pole position correction amount and of performing magnetic pole position origin correction with high accuracy.

Means for Solving the Problems

In order to achieve the above object, in the control device for the permanent magnet type rotating electrical machine of the present invention, in a state where the permanent magnet type rotating electrical machine is rotated, the d-axis current command value and the q-axis current command value in the dq vector control are kept substantially zero, an actual d-axis voltage and an actual q-axis voltage are calculated from a midpoint potential detected from a midpoint potential detection unit, the magnetic pole position correction amount is calculated based on a predetermined arithmetic expression from the actual d-axis voltage and the actual q-axis voltage, and the magnetic pole position origin correction is performed based on the magnetic pole position correction amount.

Advantage of the Invention

According to the present invention, the magnetic pole position origin correction can be performed with high accuracy based on the magnetic pole position correction amount calculated from the actual d-axis voltage and the actual q-axis voltage.

MODE FOR CARRYING OUT THE INVENTION

Hereinafter, an embodiment of a control device for a permanent magnet type rotating electrical machine according to the present invention be described with reference to the drawings. In the following embodiments, the permanent magnet type rotating electrical machine is described as a motor, and a case where the control device for the permanent magnet type rotating electrical machine is mounted on a hybrid vehicle as a motor control device is described, however, it may be naturally mounted on vehicles other than the hybrid vehicle.

Figure 1:
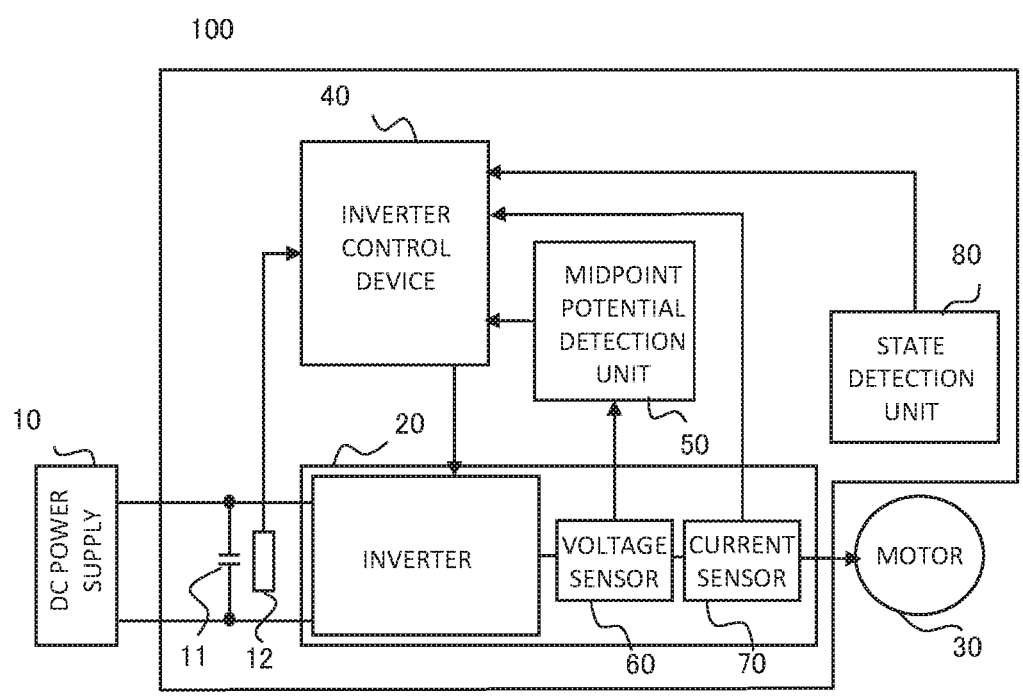
FIG. 1 is a configuration diagram showing a control device for a permanent magnet type rotating electrical machine according to an embodiment of the present invention.

FIG. 1 is a configuration diagram showing a motor control device 100 according to the embodiment of the present invention. As shown in FIG. 1, the motor control device 100 is provided between a DC power supply 10 and a motor 30. The motor control device 100 is connected between a high voltage side node P and a low voltage side node N, and includes: a smoothing capacitor 11 for smoothing a DC voltage of the DC power supply 10; an inverter 20 for converting the DC voltage of high voltage into an AC voltage by DC/AC conversion and supplying power to the motor 30; an inverter control device 40 for controlling the inverter 20; a midpoint potential detection unit 50 for detecting a midpoint potential of three-phase output of the inverter 20; a voltage sensor 60 for detecting a voltage supplied from the inverter 20 to the motor 30; a current sensor 70 for detecting a current supplied from the inverter 20 to the motor 30; and a state detection unit 80 for detecting a state of the motor 30.

Figure 2:
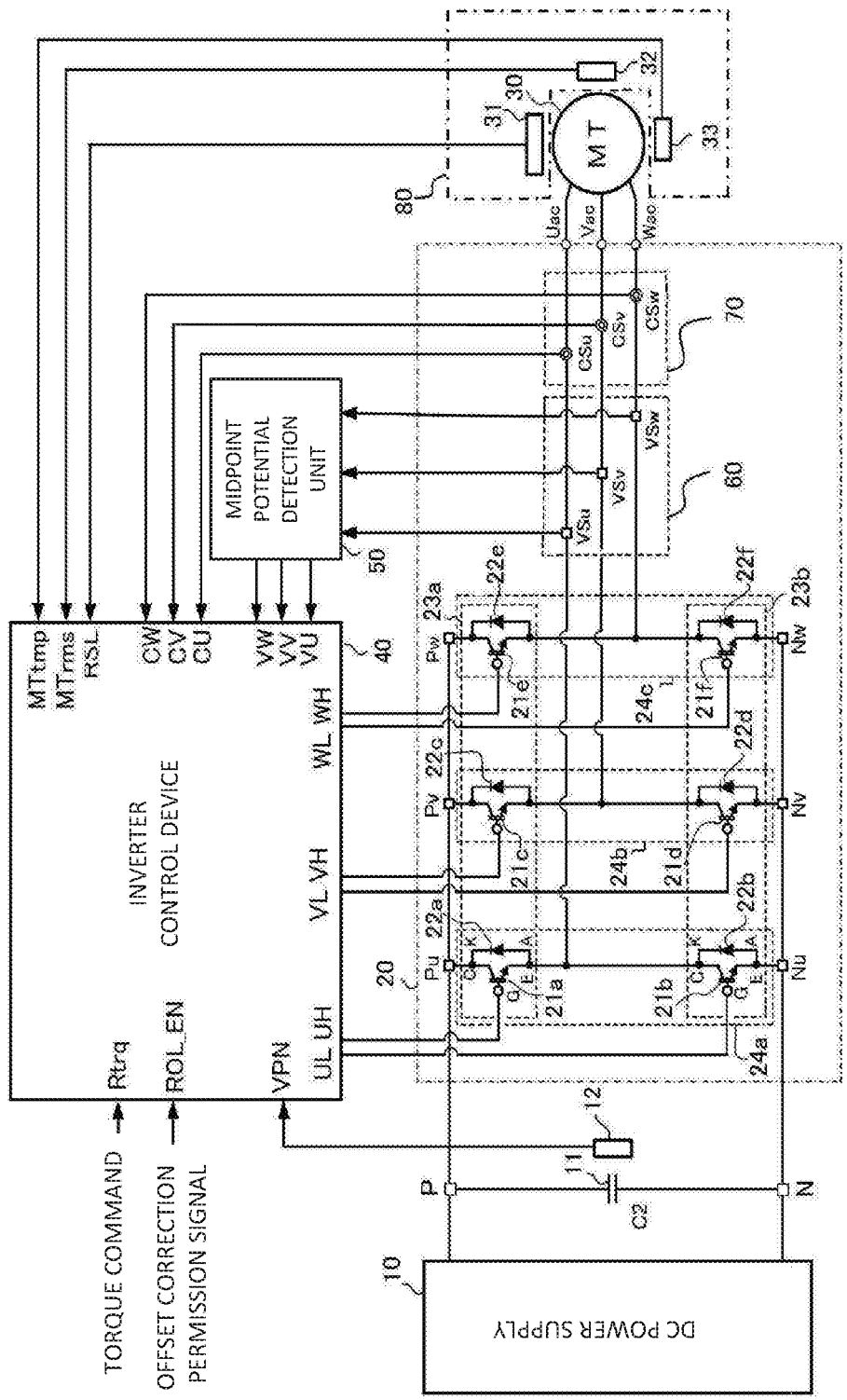
FIG. 2 is an entire configuration diagram of a specific example of the control device for the permanent magnet type rotating electrical machine according to the embodiment of the present invention.

FIG. 2 is an entire configuration diagram showing a specific example of FIG. 1. As shown in FIG. 2, the inverter includes semiconductor switching devices 21a to 21d, semiconductor rectifying devices 22a to 22d, an upper arm side power semiconductor device 23a, a lower arm side power semiconductor device 23b, a U-phase switching arm 24a, a V-phase switching arm 24b, and a W-phase switching arm 24c, and the inverter 20 further includes a voltage sensor 60 and a current sensor 70. The voltage sensor 60 detects a voltage of each phase by a voltage sensor VSu, a voltage sensor VSv, and a voltage sensor VSw, and outputs the voltages to the midpoint potential detection unit 50. The current sensor 70 detects a current of each phase b a current sensor CSu, a current sensor CSv, and a current sensor CSw, and outputs the currents to the inverter control device 40.

The state detection unit 80 includes a magnetic pole position detection unit 31 for detecting a magnetic pole position of a rotor of the motor 30, a rotational speed detection unit 32 for detecting a rotational speed of the motor 30, and a temperature detection unit 33 for detecting temperature.

The DC power supply 10 is chargeable and dischargeable, and exchanges power with the motor 30 via the inverter 20. A boost converter may be provided between the DC power supply 10 and the inverter 20, and the DC voltage supplied from the DC power supply 10 may be boosted by DC/DC conversion. The smoothing capacitor 11 is connected between the high voltage side node P and the low voltage side node N, and is configured to smooth the DC voltage. A voltage detection unit 12 measures the voltage between the high voltage side node P and the low voltage side node N of the smoothing capacitor 11 and outputs a voltage value VPN to the inverter control device 40. The inverter 20 converts a high voltage DC voltage into the AC voltage by DC/AC conversion.

The motor 30 is applied with the AC voltage output from the inverter 20, so that the driving force and a braking force of the vehicle are controlled. The magnetic pole position detection unit 31 of the state detection unit 80 is a known one configured using a Hall element or an encoder, and outputs a signal indicative of a detected value of a magnetic pole rotation angle θr (rotation angle of q axis) from a predetermined reference rotational position of the rotor of the motor 30 as a detection signal RSL of the magnetic pole position. Note that the detected value of the magnetic pole rotation angle θr obtained by the magnetic pole position detection unit 31 generally has an error with respect to an actual magnetic pole position (actual rotation angle of magnetic pole) of the rotor of the motor 30 due to an assembly error of the magnetic pole position detection unit 31 or the like.

The rotational speed detection unit 32 acquires rotation information of the motor 30. The temperature detection unit 33 additionally acquires temperature information of the motor 30. Rotational speed information of the motor 30 may be calculated from the magnetic pole position detection unit 31.

In the inverter 20, the power semiconductor device is a unit in which the semiconductor switching device and the semiconductor rectifying device are connected in antiparallel to each other. A series connection of power semiconductor devices is referred to as an arm. Here, detailed configuration of the inverter 20 will be described. The number of arms provided in the inverter 20 corresponds to the number of phases of the motor 30 to be driven, and as shown in FIG. 2, the inverter 20 includes three switching arms 24a to 24c of U-phase, V-phase and W-phase.

The U-phase switching arm 24a of the inverter 20 uses, for example, an insulated gate bipolar transistor (IGBT) made of Si as the semiconductor switching devices 21a and 21b, and a PiN diode also made of Si as the semiconductor rectifying devices 22a and 22b. Or other materials may be used.

A cathode electrode K of the semiconductor rectifying device 22a is connected to a collector electrode C of the semiconductor switching device 21a, an anode electrode A of the semiconductor rectifying device 22a is connected to an emitter electrode of the semiconductor switching device 21a, and they are connected to each other to form one unit of the power semiconductor device. Similarly, the cathode electrode K of the semiconductor rectifying device 22b is connected to the collector electrode C of the semiconductor switching device 21b, and the anode electrode A of the semiconductor rectifying device 22b is connected to the emitter electrode E of the semiconductor switching device 21b. As described above, the U-phase switching arm 24a of the inverter 20 is configured such that the power semiconductor device including the semiconductor switching device 21a and the semiconductor rectifying device 22a, and the power semiconductor device including the semiconductor switching device 21b and the semiconductor rectifying device 22b are connected in series.

The V-phase switching arm 24b and the W-phase switching arm 24c of the inverter 20 also include a series connection of the power semiconductor device including the semiconductor switching device 21c and the semiconductor rectifying device 22c, and the power semiconductor device including the semiconductor switching device 21d and the semiconductor rectifying device 22d, and a series connection of the power semiconductor device including the semiconductor switching device 21e and the semiconductor rectifying device 22e, and the power semiconductor device including the semiconductor switching device 21f and the semiconductor rectifying device 22f. The inverter control device 40 controls a switching operation of the semiconductor switching devices in the upper arm side power semiconductor device 23a and the lower arm side power semiconductor device 23b of the switching arms 24a to 24c included in the inverter 20, and adjusts potentials of connection nodes Uac, Vac, and Wac with the motor 30, to control an amount of current flowing through the motor 30.

Figure 3:
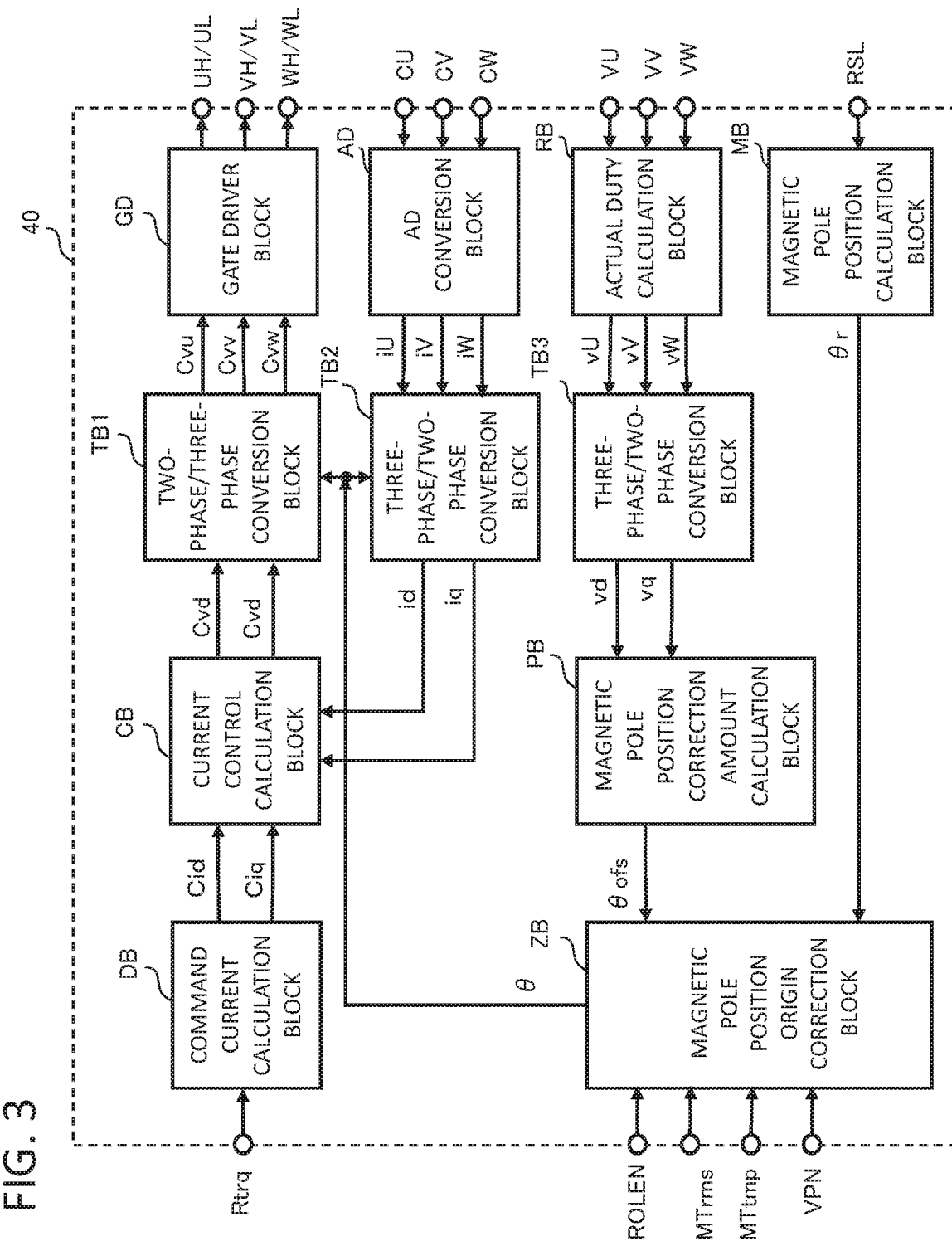
FIG. 3 is a block diagram of an inverter control device of the control device for the permanent magnet type rotating electrical machine according to the embodiment of the present invention.

As shown in FIG. 3, the inverter control device 40 includes a command current calculation block DB, a current control calculation block CB, a two-phase/three-phase conversion block TB1, a three-phase/two-phase conversion block TB2, a three-phase/two-phase conversion block TB3, a gate driver block GD, an AD conversion block AD, a magnetic pole position origin correction block ZB, a magnetic pole position correction amount calculation block PB, an actual Duty calculation block RB, and a magnetic pole position calculation block MB.

The inverter control device 40 controls rotation of the motor 30 by the dq vector control. The command current calculation block DB in the inverter control device 40 calculates a d-axis current command value Cid and a q-axis current command value Ciq in response to a torque command value Rtrq (given from outside the inverter control device 40) which is a command value of a torque generated by the motor 30, and outputs them to the current control calculation block CB.

The current control calculation block CB receives the d-axis current command value Cid and the q-axis current command value Ciq from the command current calculation block DB, and a d-axis current value id and a q-axis current value iq from the three-phase/two-phase conversion block TB2, and calculates a d-axis voltage command value Cvd and a q-axis voltage command value Cvq of two-phase DC so that deviation between the d-axis current value id and the q-axis current value iq becomes "0", to output them to the two-phase/three-phase conversion block TB1.

The two-phase/three-phase conversion block TB1 converts the d-axis voltage command value Cvd and the q-axis voltage command value Cvq of the two-phase DC into three-phase AC voltage command values Cvu, Cvv, Cvw based on a magnetic pole position θ from the magnetic pole position origin correction block ZB. The gate driver block GD controls the switching operation of the semiconductor switching devices 21a to 21f in the upper arm side power semiconductor device 23a and the lower arm side power semiconductor device 23b of the switching arm included in the inverter 20, and outputs a control signal to perform DC/AC conversion in the inverter 20.

Figure 4:
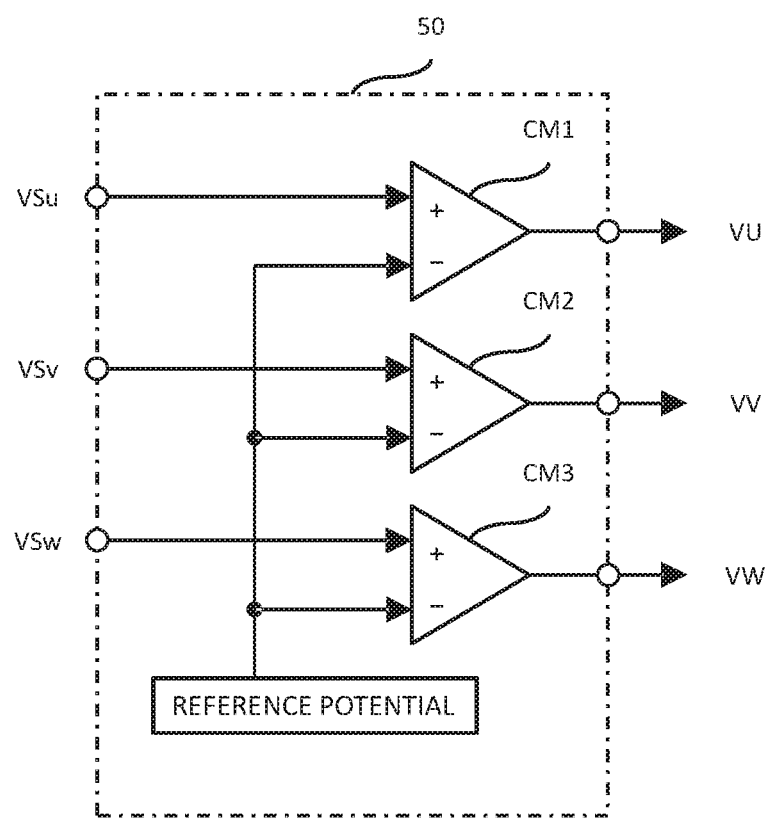
FIG. 4 is a block diagram of a midpoint potential detection unit according to the embodiment of the present invention.
Figure 5:
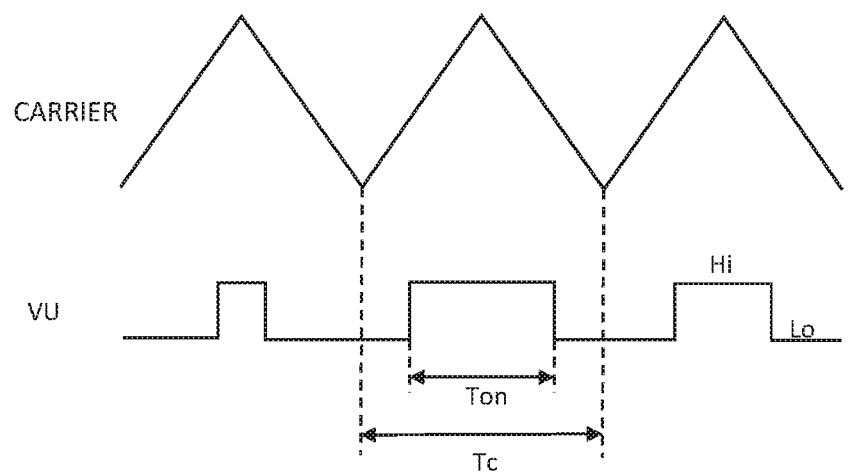
FIG. 5 is a waveform diagram for explaining midpoint potential detection according to the embodiment of the present invention.

Subsequently, a magnetic pole position origin correction process (ROL: Resolver offset learning, hereinafter referred to as ROL) will be described with reference to FIGS. 4 and 5. FIG. 4 is a configuration diagram of the midpoint potential detection unit 50 according to the embodiment of the present invention. FIG. 5 shows a waveform diagram for explaining midpoint potential detection. However, only the U-phase is shown here. Although FIG. 4 shows the configuration using a comparator, another configuration (for example, a configuration using AD conversion) may be used. In the magnetic pole position origin correction, the magnetic pole position correction amount is obtained from the midpoint potential of the inverter with the d-axis current command value Cid=0 and the q-axis current command value Ciq=0 in a state where the motor 30 is rotated.

As shown in FIG. 4, detected midpoint potentials VSu, VSv, VSw are input to comparators CM1, CM2, CM3 and compared with a reference potential. The comparators CM1, CM2, and CM3 output that the input midpoint potential is higher (Hi) or lower (to) than the reference potential. Therefore, it is possible to grasp an ON state and an OFF state based on the output of the midpoint potential detection unit 50. That is, when it is higher than the reference potential, it indicates that it is connected to the high voltage side node P of the power supply, that is, turned on, and when it is lower than the reference potential, indicates that it is connected to the low voltage side node N of the power supply, that is, turned off.

As shown in FIG. 5, assuming that a time when an output VU from the comparators CM1, CM2, CM3 is Hi is Ton, and a time from a valley to a valley of a carrier is Tc, an actual Duty value vU of VU is obtained as "Ton/Tc". That is, since the Duty value indicates a proportion (%) of ON in one cycle, it is possible to calculate the actual Duty value by counting a time higher than a reference value in one cycle.

Next, in order to perform ROL in the inverter control device 40 shown in FIG. 3, an actual Duty calculation block RB of the inverter control device 40 converts Duty of actual Duty voltages VU, VV, VW of output values from the midpoint potential detection unit 50 into actual Duty values vU, vV, vW, and outputs them to the three-phase/two-phase conversion block TB3. The three-phase/two-phase conversion block TB3 calculates an actual d-axis voltage value vd and a q-axis voltage value vq of the two-phase DC using the actual Duty values vU, vW from the actual Duty calculation block RB, and outputs them to the magnetic pole position correction amount calculation block PB.

The magnetic pole position correction amount calculation block PE uses the actual d-axis voltage value vd and the q-axis voltage value vq from the three-phase/two-phase conversion block TB3, to calculate a magnetic pole position correction amount θofs based on an arithmetic expression θofs=a tan(vd/vq), and outputs it to the magnetic pole position origin correction block ZB.

The magnetic pole position origin correction block ZB stores and holds the magnetic pole position correction amount θofs from the magnetic pole position correction amount calculation block PB, uses the magnetic pole position correction amount θofs stored and held and the magnetic pole rotation angle θr from a magnetic pole position calculation block MB, to calculate an actual magnetic pole position θ based on an arithmetic expression θ=θr−θofs, and outputs it to the two-phase/three-phase conversion block TB1 and the three-phase/two-phase conversion block TB2.

Figure 6:
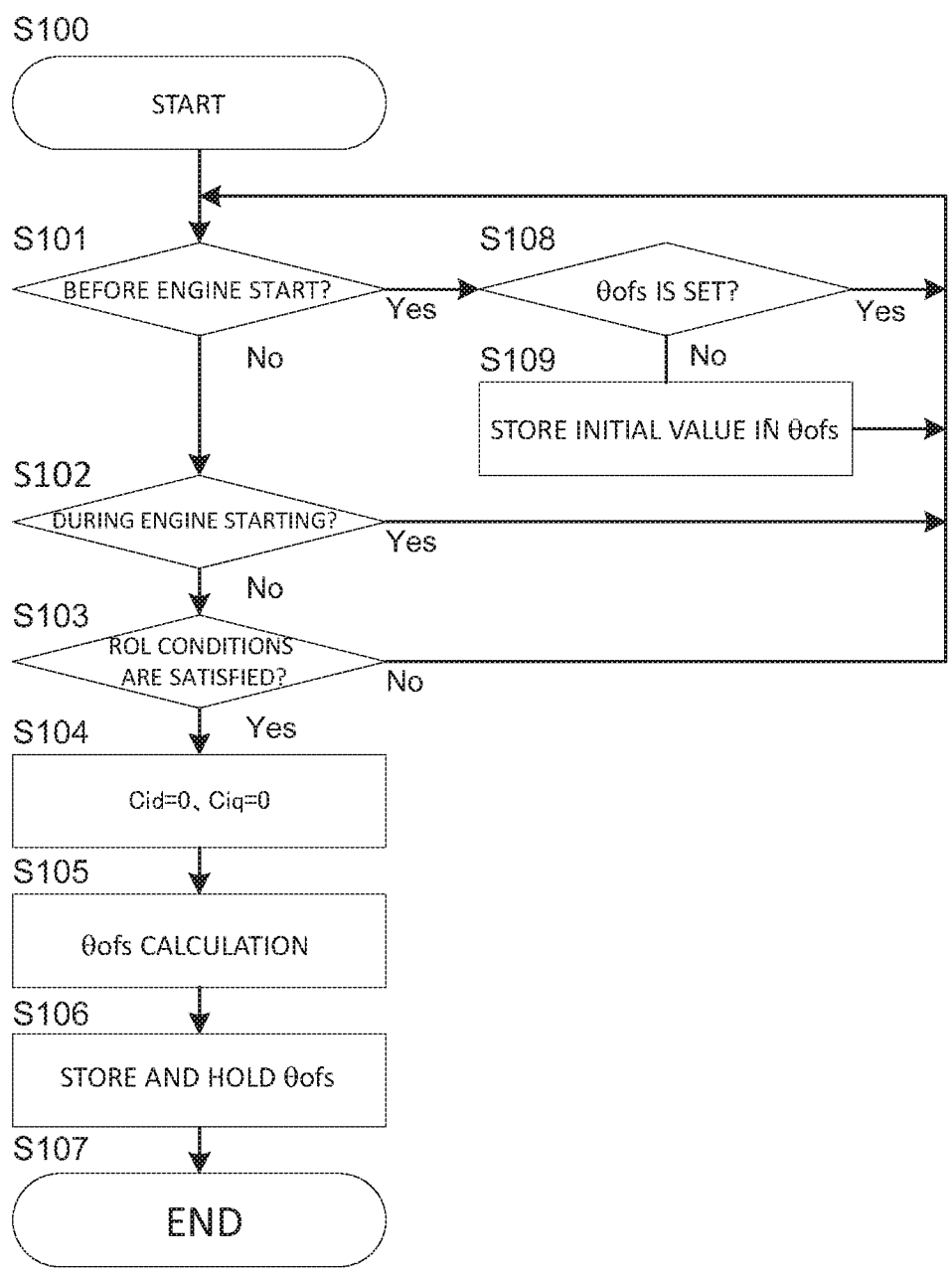
FIG. 6 is a flowchart for explaining an operation of the control device for the permanent magnet type rotating electrical machine according to the embodiment of the present invention.

The above-described ROL is performed as shown in a flowchart of FIG. 6.

First, the process is started in Step S100, and an operating state of an engine is acquired in Step S101. If it is a state before engine start, the process proceeds to Step S108 and if it is not the state before engine start, the process proceeds to Step S102.

In Step S108, if ROL has already been performed and the magnetic pole position correction amount θofs is set, the process proceeds to Step S101 again to repeat the above-described operation. If the magnetic pole position correction amount θofs is not set, an initial value is stored in the magnetic pole position correction amount θofs in Step S109. The initial value is preferably a value based on tolerance or mounting accuracy of the magnetic pole position detection unit 31.

In Step S102, the operating state of the engine is acquired, and if the engine is during starting, the process proceeds to Step S101 and the above-described operation is repeated. Since the initial value is set in the magnetic pole position correction amount θofs when the engine is during starting, an optimum torque cannot be generated in some cases, however, the torque required to start the engine can be obtained. If it is not during starting (after engine start), the process proceeds to Step S103.

Figure 7:
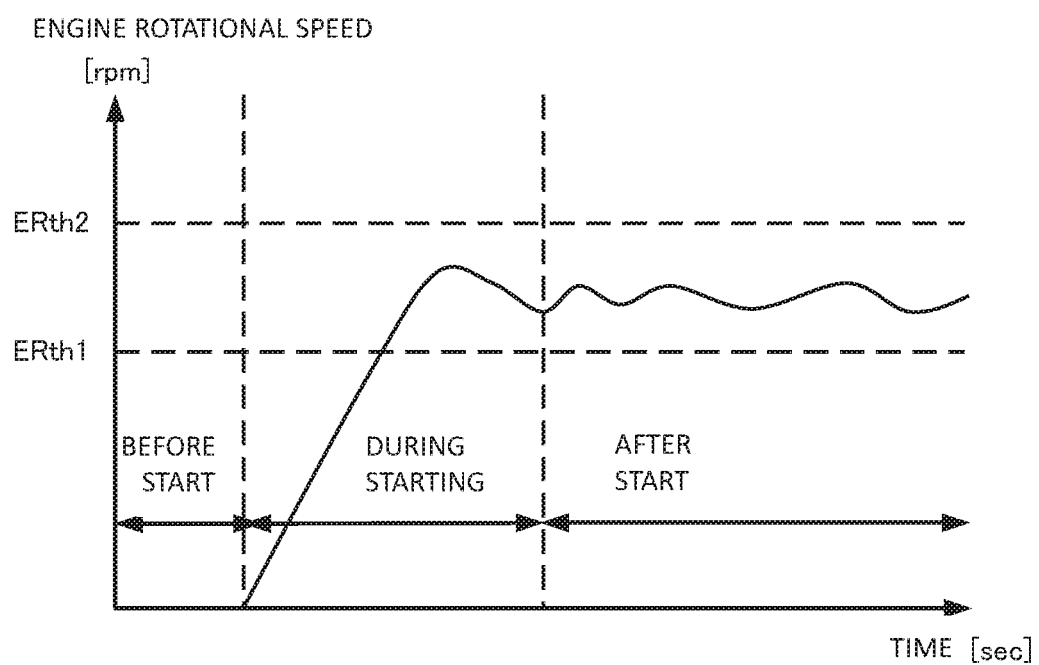
FIG. 7 is an explanatory view showing conditions for performing magnetic pole position origin correction according to the embodiment of the present invention.

That is, from before the start to after the start of the engine, the rotational speed of the engine changes as shown in FIG. 7. The rotational speed of the engine is naturally zero before the start of the engine, the rotational speed becomes a predetermined rotational speed or more and enters a stable state during engine starting, and the rotational speed is in a pulsating state within a stable range after engine start. The magnetic pole position origin correction is performed by setting conditions depending on the rotational speed of the engine. That is, by performing the magnetic pole position origin correction when the rotational speed of the permanent magnet type rotating electrical machine is substantially constant, it is possible to avoid the conditions in which the calculation accuracy is deteriorated, thereby performing the magnetic pole position origin correction with high accuracy.

In Step S103, it is determined whether the conditions for performing ROL can be satisfied, and if satisfied, the process proceeds to Step S104. If not satisfied, the process proceeds to Step S101 to repeat the above-described operation.

In Step S104, the d-axis current command value Cid and the q-axis current command value Ciq are set to zero. As a result, armature current flowing through each of phases U, V, W of the motor 30 is controlled to substantially zero.

In Step S105, after waiting for a predetermined time until the armature current of each phase of the motor 30 sufficiently converges to near zero, the magnetic pole position correction amount θofs is calculated, and the process proceeds to Step S106. Or, after waiting for a predetermined time, if a d-axis current id and a q-axis current iq are substantially constant, the process proceeds to Step S106, and if they do not converge to substantially constant values, the process is ended. By performing the magnetic pole position origin correction when the d-axis current and the q-axis current are substantially constant, it is possible to avoid the conditions in which the calculation accuracy is deteriorated, thereby performing the magnetic pole position origin correction with high accuracy.

In ep S106, the magnetic pole position correction amount θofs calculated in the magnetic pole position correction amount calculation block PB is stored and held in the magnetic pole position origin correction block ZB, and the ROL process is ended in Step S107. Here, the magnetic pole position correction amount θofs may be limited so that the magnetic pole position correction amount θofs is within a preset range of threshold values. In Step S106, the magnetic pole position correction amount θofs stored and held in the magnetic pole position origin correction block ZB is calculated with the magnetic pole rotation angle θr to calculate the actual magnetic pole position θ.

In the ROL processing described so far, accurate correction of the magnetic pole position can be performed by calculating the magnetic pole position correction amount θofs based on a midpoint potential of the inverter, thereby reducing reduction in power factor and efficiency.

In the conditions for performing ROL of Step S103, ROL may be performed when an offset correction permission signal ROL_EN shown in FIG. 2 is "permission". In this way, by performing the magnetic pole position origin correction based on the permission signal, it is possible to prevent an unintended torque fluctuation from occurring when starting a process of calculating an origin position.

Figure 8:
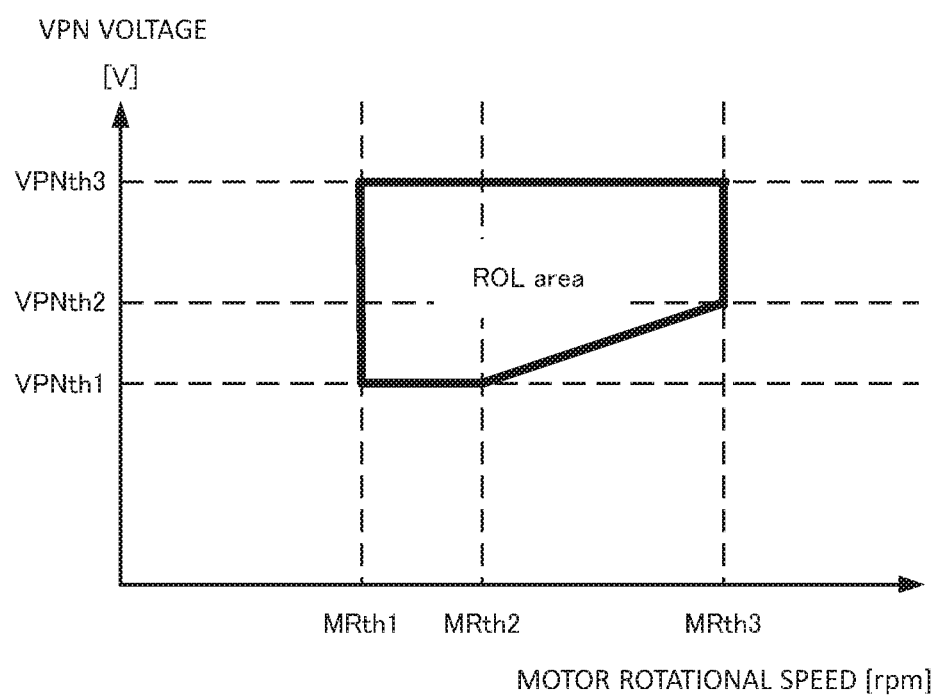
FIG. 8 is an explanatory view showing conditions for performing the magnetic pole position origin correction according to the embodiment of the present invention.

The condition may be that the rotational speed of the motor 30 detected by the rotational speed detection unit 32 of the state detection unit 80 shown in FIG. 2 is within a preset range of threshold values. Thus, it is possible to avoid the conditions in which the calculation accuracy is deteriorated, thereby performing the magnetic pole position origin correction with high accuracy. Further, the condition may be that the voltage value VPN between the high voltage side node P and the low voltage side node N of the smoothing capacitor 11 detected by the voltage detection unit 12 shown in FIG. 1 is within a preset range of threshold values. FIG. 8 shows an example of a case where the rotational speed of the motor 30 and the voltage value VPN are within the preset range of threshold values. That is, by performing the magnetic pole position origin correction when the voltage of the DC power supply is within the preset range of the threshold values, it is possible to avoid the conditions in which the calculation accuracy is deteriorated, thereby performing the magnetic pole position origin correction with high accuracy.

The condition may be that the rotational speed of the motor 30 detected by the rotational speed detection unit 32 shown in FIG. 1 is substantially constant.

The threshold values of the rotational speed of the motor 30 described above may be changed depending on the temperature of the motor 30 detected by the temperature detection unit 33 shown in FIG. 2. By changing the threshold values of the rotational speed depending on magnet temperature of the permanent magnet type rotating electrical machine, it is possible to avoid the conditions in which the calculation accuracy is deteriorated, thereby performing the magnetic pole position origin correction with high accuracy.

The condition may be that the voltage VPN detected by the voltage detection unit 12 shown in FIG. 1 is substantially constant. In this way, by performing the magnetic pole position origin correction when the voltage of the DC power supply substantially constant, it possible to avoid the conditions in which the calculation accuracy is deteriorated, thereby performing the magnetic pole position origin correction with high accuracy.

Figure 9:
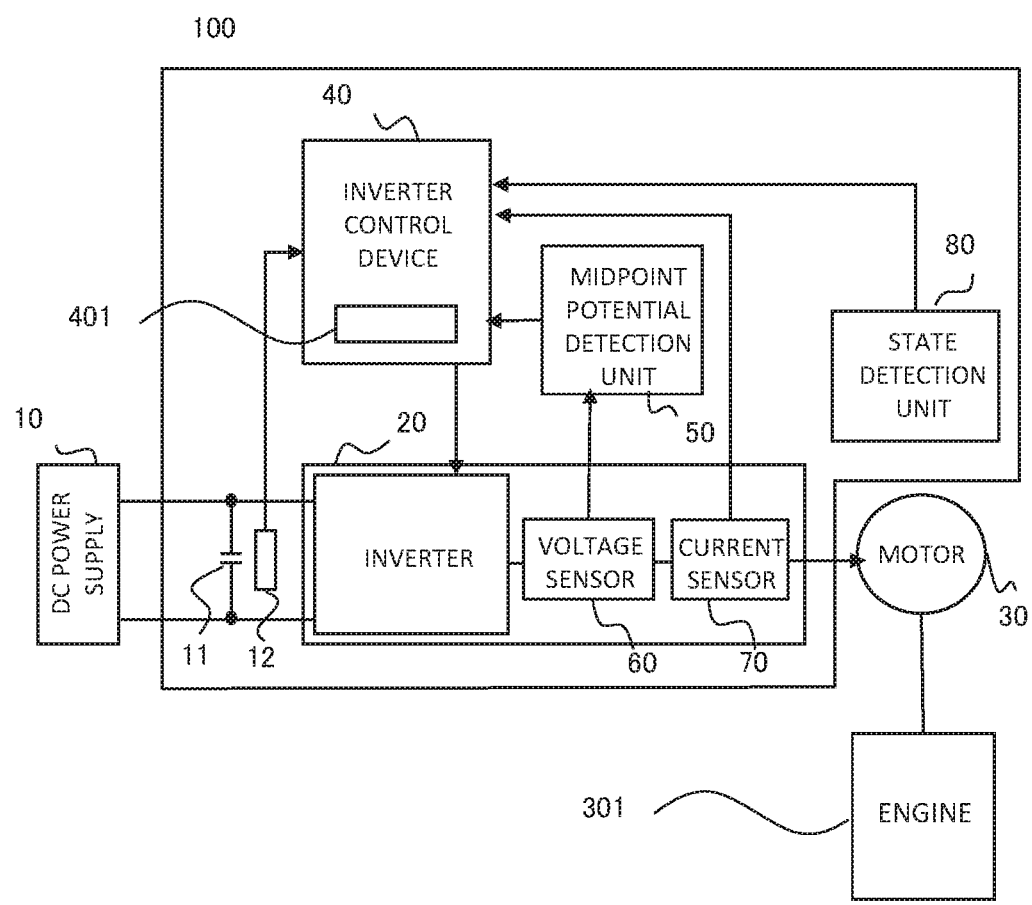
FIG. 9 is a configuration diagram showing the control device for the permanent magnet type rotating electrical machine according to the embodiment of the present invention.

In the embodiment described above, the permanent magnet type rotating electrical machine is described as the motor, and a case where the control device for the permanent magnet type rotating electrical machine mounted on hybrid vehicle as the motor control device is described. However, in a case where the motor 30 is mounted on the hybrid vehicle, the motor 30 is connected to an output shaft (drive shaft) of an engine 301 as shown in FIG. 9, to start the engine by starting the motor. Further, the motor 30 is rotated by the engine 301.

In such a case, the inverter control device 40 includes a start time control unit 401 in which a temporary correction value (first correction value) is set, and after a predetermined time of start of the engine 301 by the motor 30, appropriate motor control can be performed by performing the magnetic pole position origin correction based on the midpoint potential detection of the present invention.

That is, the motor is controlled using the first correction value until the rotation of the motor 30 reaches a predetermined state, and the magnetic pole position origin correction is performed based on the midpoint potential detection of the present invention when the rotation reaches the predetermined state. Such start of the engine 301 is necessary to enable start of the engine by the motor even before the magnetic pole position origin correction.

Figure 10:
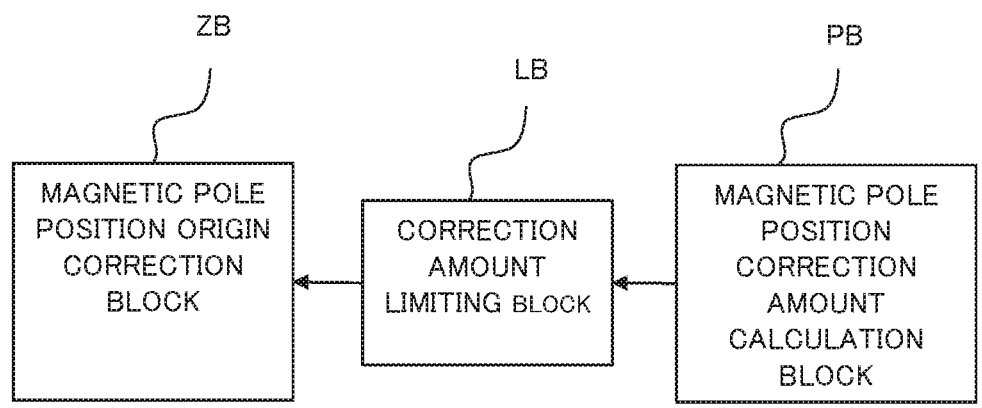
FIG. 10 is a block diagram of the inverter control device of the control device for the permanent magnet type rotating electrical machine according to the embodiment of the present invention.

In the inverter control device 40 shown in FIG. 3, the magnetic pole position correction amount θofs of the output of the magnetic pole position correction amount calculation block PB is provided as it is to the magnetic pole position origin correction block ZB. However, as a safety measure when the correction amount becomes extremely large for some reason, as shown in FIG. 10, by providing a correction amount limiting block LB at the output of the magnetic pole position correction amount calculation block PB, a countermeasure can be taken when the magnetic pole position correction amount θofs is an unexpected value.

If a failure occurs in the midpoint potential detection unit 50, the voltage sensor 60 or the like, the calculated correction amount may largely deviate from a required value. In such a case, an error of the torque will be larger than before the correction is performed. Therefore, for example, the threshold value is determined based on the tolerance, the accuracy of mounting position or the like of the magnetic pole position detection unit 31, and when the output value exceeds the threshold value, the control can be continued using the value before correction, thereby displaying the failure.

Figure 11:
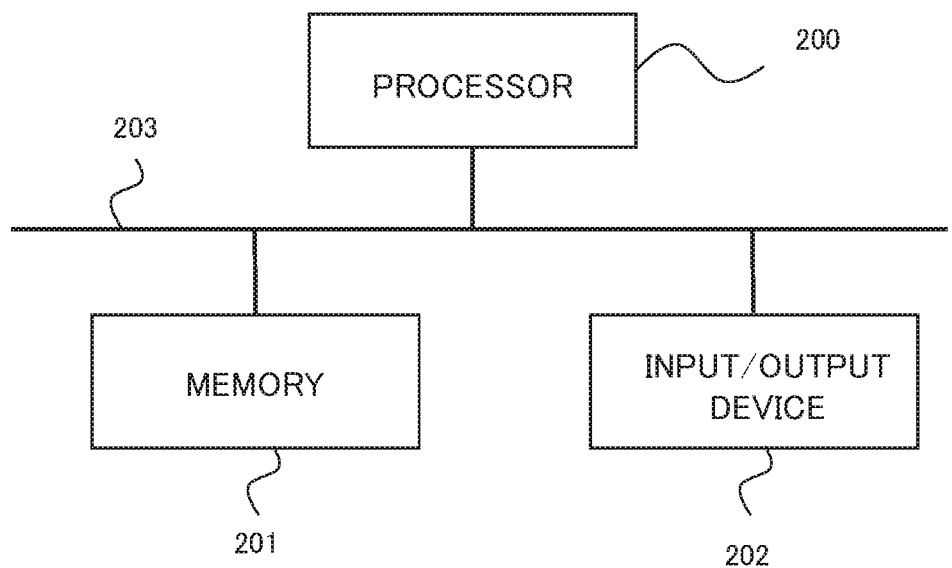
FIG. 11 is a hardware configuration diagram for realizing the block diagram according to the embodiment of the present invention.

Each of functional blocks shown in FIGS. 1 and 3 is realized by hardware shown in FIG. 11. That is, a processor 200, a memory 201 for storing programs and data, and an input/output device 202 such as a sensor are connected by a data bus 203, and data processing and data transmission are performed under control of the processor 200.

Although the embodiments of the present invention have been described above, the present invention is not limited to the embodiments, but various design changes can be made, and the embodiments can be appropriately modified or omitted. Further, it is also possible to combine and implement the content described as the embodiments.

The invention claimed is:

1. A control device for a permanent magnet type rotating electrical machine, comprising:
    an inverter connected between a DC power supply and the permanent magnet type rotating electrical machine and for converting a DC voltage output from the DC power supply into an AC voltage;
    an inverter control device for controlling driving of the inverter;
    a magnetic pole position detector that detects a current magnetic pole position of the permanent magnet type rotating electrical machine; and
    a midpoint potential detector for detecting a midpoint potential of the inverter, wherein
    in a state where the permanent magnet type rotating electrical machine is rotated, the inverter control device is configured to:
        set a d-axis current command value and a q-axis current command value in dq vector control to substantially zero,
        calculate an actual d-axis voltage and an actual q-axis voltage from the midpoint potential detected from the midpoint potential detector when the d-axis current command value and the q-axis current command value are set to substantially zero,
        calculate a magnetic pole position correction amount based on a predetermined arithmetic expression from the calculated actual d-axis voltage and the actual q-axis voltage, and
        correct the detected current magnetic pole position based on the calculated magnetic pole position correction amount.

2. The control device for the permanent magnet type rotating electrical machine according to claim 1, wherein the magnetic pole position origin correction is performed when a rotational speed of the permanent magnet type rotating electrical machine is within a preset range of threshold values.

3. The control device for the permanent magnet type rotating electrical machine according to claim 2, wherein the threshold values of the rotational speed are changed depending on magnet temperature of the permanent magnet type rotating electrical machine.

4. The control device for the permanent magnet type rotating electrical machine according to claim 1, wherein the magnetic pole position origin correction is performed when the rotational speed of the permanent magnet type rotating electrical machine is substantially constant.

5. The control device for the permanent magnet type rotating electrical machine according to claim 1, wherein the magnetic pole position origin correction is performed when the voltage of the DC power supply is within a preset range of threshold values.

6. The control device for the permanent magnet type rotating electrical machine according to claim 1, wherein the magnetic pole position origin correction is performed when the voltage of the DC power supply is substantially constant.

7. The control device for the permanent magnet type rotating electrical machine according to claim 1, wherein the magnetic pole position origin correction is performed when a d-axis current and a q-axis current are substantially constant.

8. The control device for the permanent magnet type rotating electrical machine according to claim 1, wherein the magnetic pole position origin correction is performed based on a permission signal.

9. The control device for the permanent magnet type rotating electrical machine according to claim 1, wherein the engine is started with a preset first correction value in a state where the permanent magnet type rotating electrical machine is connected to an output shaft of an engine, and the magnetic pole position origin correction is performed in a state where the permanent magnet type rotating electrical machine is rotated by the engine.

10. The control device for the permanent magnet type rotating electrical machine according to claim 1, wherein in the magnetic pole position origin correction, the magnetic pole position correction amount is limited so that the calculated magnetic pole position correction amount is within a range of preset values.

\* \* \* \* \*